United States Patent [19]
Yokoyama

[11] Patent Number: 6,108,176
[45] Date of Patent: Aug. 22, 2000

[54] MAGNETIC HEAD HAVING INCREASED ELECTRODE HEIGHT AND INCREASED SVE-ELECTRODE CONTACT AREA FOR REDUCING HEAD NOISE AND MAGNETIC STORAGE DEVICE HAVING SAME

[75] Inventor: Yukimasa Yokoyama, Kawasaki, Japan

[73] Assignee: Fujitsu Limited, Kawasaki, Japan

[21] Appl. No.: 09/009,102

[22] Filed: Jan. 20, 1998

[30] Foreign Application Priority Data

Sep. 17, 1997 [JP] Japan .................................... 9-251748

[51] Int. Cl.[7] .......................................................... G11B 5/39
[52] U.S. Cl. ....................................................... 360/324.11
[58] Field of Search ................................... 360/113, 125, 360/126, 103, 324.11

[56] References Cited

U.S. PATENT DOCUMENTS

| | | | |
|---|---|---|---|
| 5,371,643 | 12/1994 | Yuito et al. | 360/113 |
| 5,493,467 | 2/1996 | Cain et al. | 360/113 |
| 5,600,518 | 2/1997 | Koga | 360/113 |
| 5,731,937 | 3/1998 | Yuan | 360/113 |
| 5,790,352 | 8/1998 | Cunningham | 360/113 |
| 5,809,636 | 9/1998 | Shouji et al. | 29/603.14 |
| 5,828,530 | 10/1998 | Gill et al. | 360/113 |

FOREIGN PATENT DOCUMENTS

| | | |
|---|---|---|
| 7-110921 | 4/1995 | Japan . |
| 7-142783 | 6/1995 | Japan . |
| 7-320229 | 12/1995 | Japan . |
| 8-147631 | 6/1996 | Japan . |

*Primary Examiner*—Jefferson Evans
*Attorney, Agent, or Firm*—Greer, Burns & Crain, Ltd.

[57] ABSTRACT

A magnetic head includes a spin-valve head element having a spin-valve element and a plurality of layers and electrodes connected to each end of the spin-valve head element, respectively. The spin-valve head element has a structure such that a height of at least one of the plurality of layers is higher than a height of the spin-valve element. Also, the spin-valve head element may have a structure such that a height of at least one of the plurality of layers at both end portions in a core-width direction is higher than the height of the spin-valve element.

9 Claims, 5 Drawing Sheets

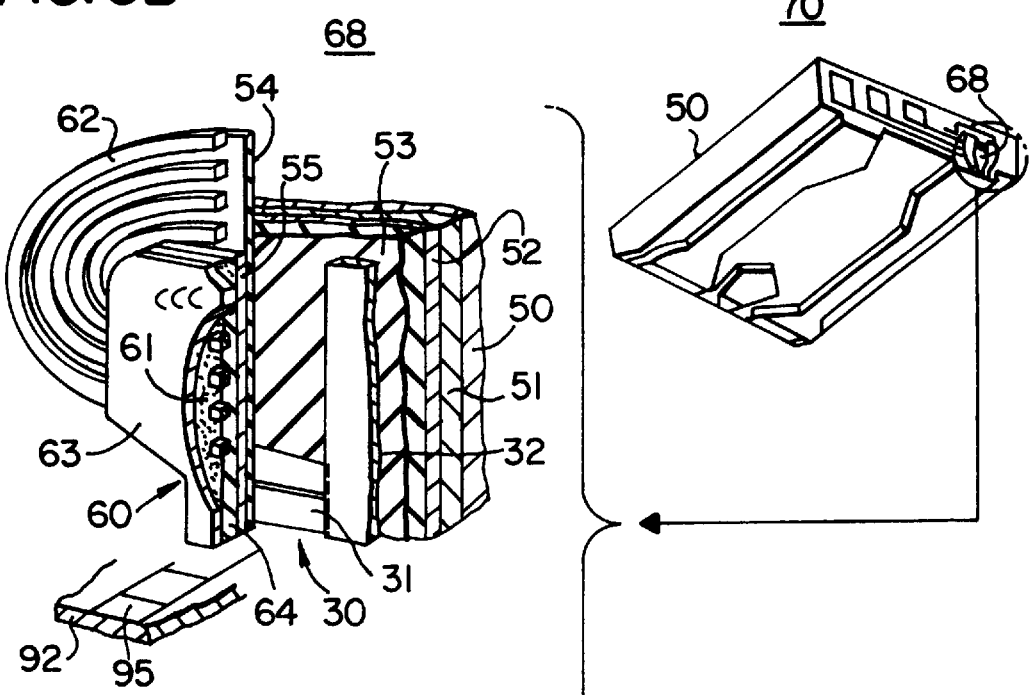
FIG. 3A
FIG. 3B
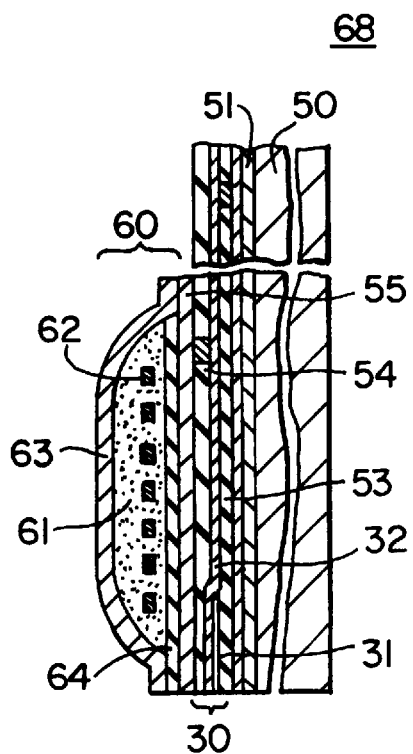
FIG. 3C

MAGNETIC HEAD HAVING INCREASED ELECTRODE HEIGHT AND INCREASED SVE-ELECTRODE CONTACT AREA FOR REDUCING HEAD NOISE AND MAGNETIC STORAGE DEVICE HAVING SAME

BACKGROUND OF THE INVENTION

1. Field of the Invention

The present invention generally relates to a magnetic head and a magnetic storage device provided with the magnetic head, and particularly relates to a magnetic head including a spin-valve head element and a magnetic storage device provided with the magnetic head.

Recently, magnetic disk devices are required to have a higher surface recording density. To provide a magnetic head which is suitable for a magnetic disk having a surface recording density of, for example, over 5G bits/(inch)$^2$, a GMR(giant magnetoresistive) magnetic head has been developed as a next-generation magnetic head. This reproduction-only GMR magnetic head includes a spin-valve head element. The spin-valve head element utilizes a giant magnetoresistive (GMR) effect. The GMR effect changes a resistance by sensing a magnetic field and the change in the resistance is several times larger than the change caused by an AMR effect. Thus, it is possible to reproduce information recorded in a magnetic disk which has higher surface recording density.

With the GMR magnetic head having the spin-valve head element, a stronger output is required and thus a higher signal-to-noise (S/N) ratio, in order to stabilize the reproduction of the information on the magnetic disk having higher surface recording density.

2. Description of the Related Art

FIG. 1 shows a GMR magnetic head 10 of the prior art. The GMR magnetic head 10 includes a spin-valve head element 11 and electrodes 12,13 connected to each end of the spin-valve head element 11, respectively. The spin-valve head element 11 is defined as including an antiferromagnetic layer 15, a spin-valve element 16 and a backing layer 17, which are laminated in an element-layer-thickness direction, and also includes hard layers 18,19 at each end in a core-width direction. The hard layers 18,19 are magnets for controlling domains of a pin layer 20 and a free layer 22, which will be described later. The spin-valve element 16 is defined as including the pin layer 20, a non-magnetic intermediate layer 21 and the free layer 22. A direction of magnetization of the pin layer 20 is in the element-height direction and a direction of magnetization of the free layer 22 is in the core-width direction, the two directions being orthogonal. A sense current flows through the spin-valve element 16 via the electrodes 12,13. As the GMR magnetic head 10 scans a rotating magnetic disk, a magnetic field from the magnetic disk changes the direction of magnetization of the free layer 22. Thus, the relation between the direction of magnetization of the pin layer 20 and the direction of magnetization of the free layer 22 changes, and the resistance of the spin-valve element 16 is also changed. The change in the resistance of the spin-valve element 16 is detected as a change in voltage. Thus, the information recorded on the magnetic disk is reproduced.

The spin-valve element 16 has a height of h1 and a core width of w1. As will be described, the height and width are set to obtain a desired stronger output.

Also, each of the surfaces 25, at each end of the spin-valve head element 11 in the core-width direction, has an area S1 (indicated as a hatched are). (Here, the hard layers 18,19 are omitted for convenience.) In other words, a connection part between the electrodes 12 or 13 and the spin-valve head element 11 has a connection area of S1.

A reproduction signal is generated when the GMR magnetic head 10 reproduces the information recorded in the magnetic disk. Generally, an output of the reproduction signal is substantially inversely proportional to the height h1 of the spin-valve head element 11 (and substantially proportional to the core width w1 of the spin-valve head element 11). Thus, the height h1 of the spin-valve head element 11 is determined to be as small as possible, considering the resistance of the element or reproduction characteristic, such as bias, and reliability. Thus, the GMR magnetic head 10 reproduces the information at a stronger output.

However, if the height h1 of the spin-valve 16 is small, the area Si of the surface 25 at each end of the spin-valve head element 11 is reduced. Thus, the contact area S1 of the connection part between the electrodes 12 of 13 and the spin-valve head element 11 is also reduced.

Next, a noise that occurs upon reproduction of the information on the magnetic disk will be discussed. The noise is a synthesis of a noise from the GMR magnetic disk, a head-noise generated at the GMR magnetic head 10 and a noise generated in a circuit of the magnetic disk device. Among the above three noises, the head-noise generated at the GMR magnetic head 10 tends to be higher, when the resistance of a path through which the sense current flows is higher.

There is a problem with head-noise in the prior magnetic head 10 since the contact area S1 of the connection part between the electrodes 12 or 13 and the spin-valve head element 11 is small, the resistance of the connection part between the electrodes 12 or 13 and the spin-valve head element 11 has a high value.

Accordingly, there is a need for a spin-valve head element having the smallest possible height which makes it possible for the GMR magnetic head to reproduce signals at a stronger output.

Also, there is a need for reduced contact area of the connection part between the electrodes and the spin-value head element, which can achieve lower resistance of the connecting part.

SUMMARY OF THE INVENTION

Accordingly, it is a general object of the present invention to provide a magnetic head and a magnetic storage device which includes such a magnetic head, which can satisfy the needs described above.

It is another and more specific object of the present invention to provide a magnetic head and a magnetic storage device having such a magnetic head, which can achieve a sufficient output of reproduced signals and sufficiently reduce head-noise.

In order to achieve the above objects according to the present invention, a magnetic head has a spin-valve head element having a spin-valve element and a plurality of layers and electrodes connected to each end of the spin-valve head element. The spin-valve head element has a structure such that a height of at least one of the plurality of layers is greater than a height of the spin-valve element.

In the magnetic head described above, the connection area of the connection part between the electrodes and the spin-valve head element is larger than that of the prior art, and the resistance at the connection part is lower than that of the prior art. Thus, the resistance of the path through which the sense current flows is lower than that of the prior art. Thereby, the head-noise is reduced and the S/N ratio is increased when compared to the prior art. Also, since the height of the spin-valve element is not increased, the strong output characteristic is not degraded when compared to the prior art.

It is still another object to provide a magnetic head and a magnetic storage device including such a magnetic head, which can achieve an efficient reduction in head-noise.

In order to achieve the above object according to the present invention, a spin-valve head element has a structure such that a height of the backing layer and the antiferromagnetic layer is more than twice as large as a height of the spin-valve element.

It is yet another object to provide a magnetic head and a magnetic storage device including such a magnetic head, which can achieve an improved efficiency in the use of a sense current.

In order to achieve the above object according to the present invention, the spin-valve head element has a structure such that a height of both end portions in the core-width direction of at least one of the plurality of layers is higher than a height of the spin-valve element. The connection area of the connection part between the electrodes and the spin-valve head element is larger than that of the prior art and the resistance at the connection part is lower than that of the prior art. Thus, the resistance of the path through which the sense current flows is lower than that of the prior art. Thereby, the head-noise is reduced and the S/N ratio is increased when compared to the prior art. Also, since the height of the spin-valve element is not increased, the strong output characteristic is not degraded when compared to the prior art. Further, since part of a spin-valve element is between both ends in the core-width direction, the sense current only flows through the spin-valve element. Thus, improved efficiency in using the sense current is achieved.

It is yet another object to provide a magnetic head and a magnetic storage device including such a magnetic head, which can achieve the best efficiency in using a sense current.

In order to achieve the above object according to the present invention, a spin-valve head element has a structure such that a height of a backing layer and an antiferromagnetic layer at each end portion in the core-width direction is more than twice as large as a height of the spin-valve element. Accordingly, head-noise is effectively reduced while the sense current only flows through the spin-valve element. Thus, the best efficiency in using the sense current is achieved.

It is yet another object to provide a magnetic head slider which has a strong output characteristic and a high S/N ratio characteristic.

In order to achieve the above object according to the present invention, a magnetic head slider includes a magnetic head having either one of the above described structures at an end surface of the slider.

It is yet another object of the invention to provide a magnetic storage device which can provide a reproduction signal having reduced noise compared to the prior art while maintaining the strong output characteristic.

In order to achieve the above object according to the present invention, a magnetic storage device includes a magnetic storage medium and a magnetic head slider including a magnetic head having either one of the above described structures at an end surface of the slider.

Other objects and further features of the present invention will be apparent from the following detailed description when read in conjunction with the accompanying drawings.

BRIEF DESCRIPTION OF THE DRAWINGS

FIGS. 3A–3C are diagrams showing a composite magnetic head having a GMR magnetic head shown in FIG. 2.

DETAILED DESCRIPTION OF THE PREFERRED EMBODIMENTS

In the following, an embodiment of the present invention will be described with reference to the accompanying drawings.

Figure 2:
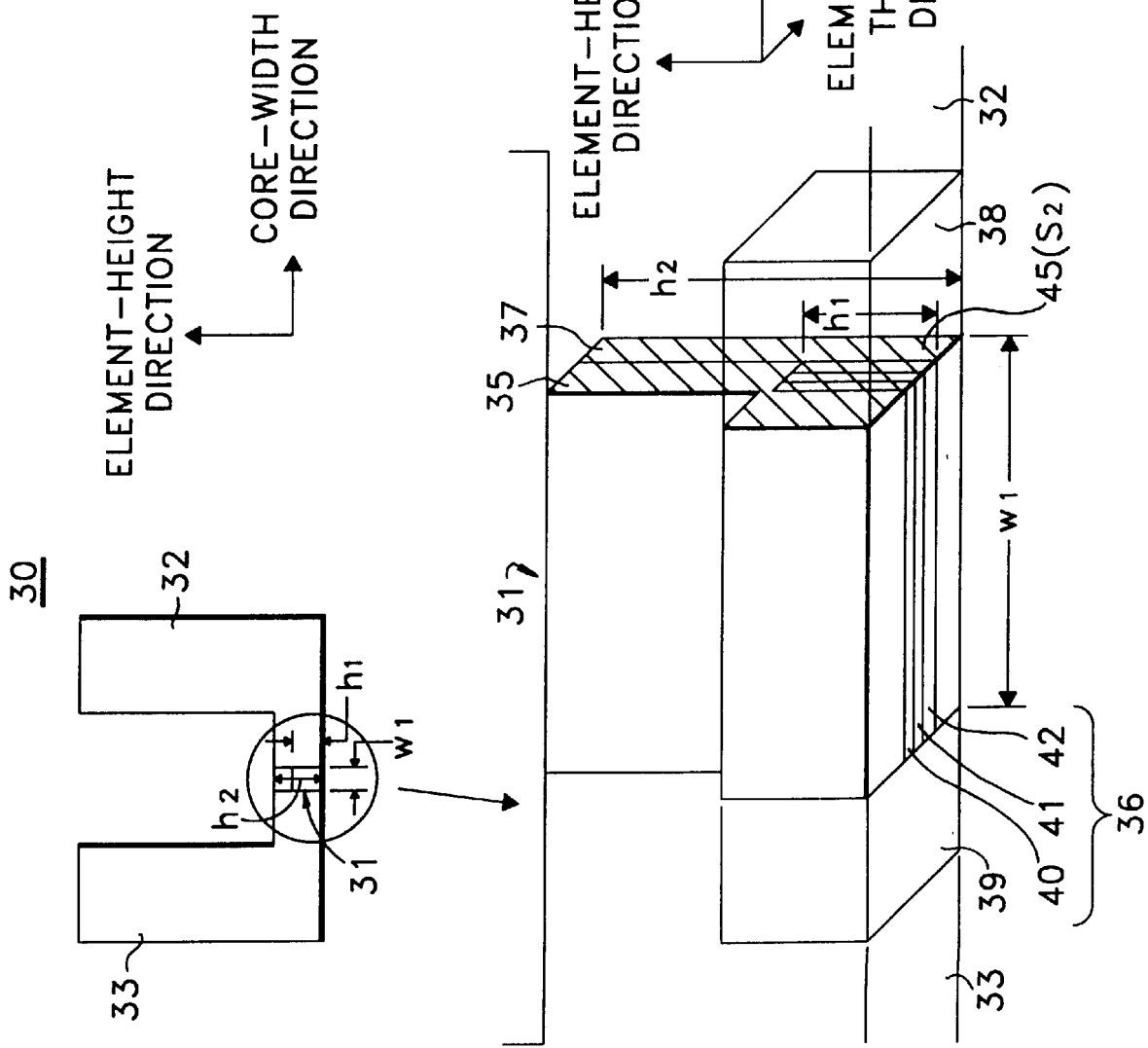
FIG. 2 is a schematic diagram showing a GMR magnetic head of the first embodiment of the present invention.

FIG. 2 shows a GMR magnetic head 30 for reproduction only, of the first embodiment of the present invention. As shown in FIGS. 3A–3C, the GMR magnetic head 30 is integrated with an induction-type magnetic head 60 for recording only, to form a composite magnetic head 68. The composite magnetic head 68 is provided at the back end surface of a slider 50.

The GMR magnetic head 30 includes a spin-valve head element 31 and electrodes 32,33 connected to both ends of the spin-valve head element 31. The spin-valve head element 31 is defined as including an antiferromagnetic layer 35, a spin-valve element 36 and a backing layer 37, which are laminated in an element-layer-thickness direction, and also including hard layers 38,39 at each end in the core-width-direction. The hard layers 38,39 are magnets for controlling domains of pin layer 40 and a free layer 42, which will be described later. The spin-valve element 36 is defined as including the pin layer 40, a non-magnetic intermediate layer 41 and the free layer 42. A direction of magnetization of the pin layer 40 is in the element-height direction and a direction of magnetization of the free layer 42 is in a core-width direction, the two directions being orthogonal. A sense current flows through the spin-valve element 36 via the electrodes 32,33. As the GMR magnetic head 30 relatively scans a rotating magnetic disk 92 (see FIG. 4), a magnetic field from the magnetic disk causes a change in the direction of magnetization of the free layer 42. Thus, the relation between the direction of magnetization of the pin layer 40 and the direction of magnetization of the free layer 42 changes, and the resistance of the spin-valve element 36 is changed. The change in the resistance of the spin-valve element 36 is detected as a change in voltage, thereby reproducing the information recorded on the magnetic disk.

The spin-valve element 36 has a height of h1 and a core width of w1. The height h1 is approximately 1 µm and the core width w1 is approximately 1µm. This is to obtain a desired higher output.

The antiferromagnetic layer 35 and the backing layer 37 has a height h2 which is higher than the height h1 of the spin-valve element 36. In fact, the height h2 is approximately twice or three times higher than the height h1.

Figure 1:
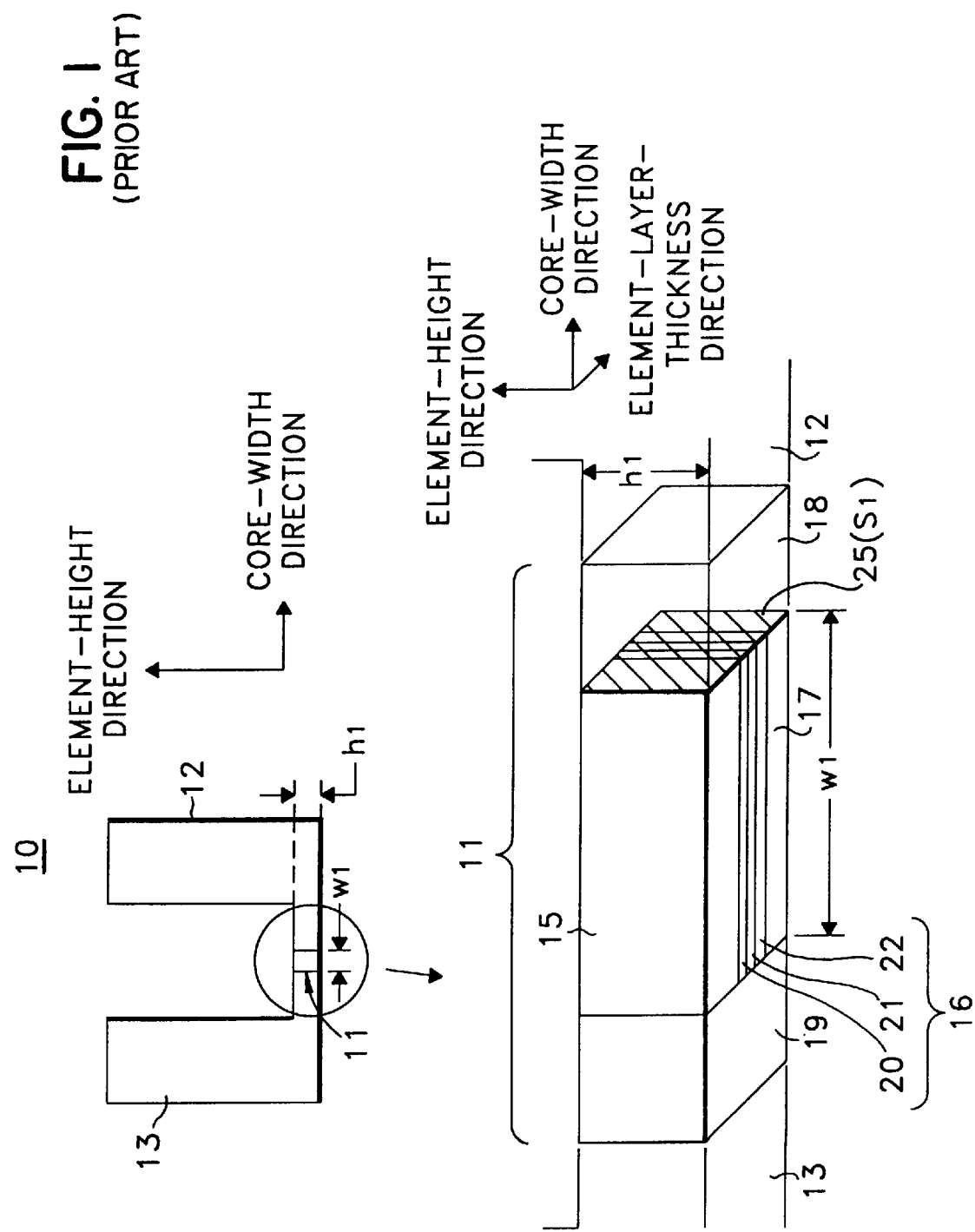
FIG. 1 is a schematic diagram showing a GMR magnetic head of the prior art.

Therefore, each of the hatched surfaces 45, at each end of the spin-valve head element 31 in the core-width direction has an area of S2. (Here, the hard layers 38,39 are omitted for convenience.) The area S2 is larger than the are S1 of the end surfaces 25 shown in FIG. 1 by a factor of approximately 1.6. Thus, a connection part between the electrodes 32,33 and the spin-valve head element 31 has a connection area of S2. The connection area is approximately 1.6 times larger than the area S1 of the prior art shown in FIG. 1.

The antiferromagnetic layer 35 may be, for example, of FeMn. The backing layer 37 may be of Ta. The pin layer 40 maybe of CoFe. The intermediate layer 41 may be of Cu. The free layer 42 may be of NiFe.

The above described GMR magnetic head 30 has the following characteristics.

First, the connection area S2 of the connection part between the electrodes 32 or 33 and the spin-valve head element 31 is larger than that of the prior art, and the resistance at the connection part between the electrodes 32 or 33 and the spin-valve head element 31 is lower than that of the prior art. Thus, the resistance of the path through which the sense current flows is lower than that of the prior art. Thereby, the head-noise is reduced and the S/N ratio is increased compared to the prior art.

Secondly, the height of the spin-valve element 36 is not increased. The spin-valve element 36 has a height of h1 and a core-width w1. Therefore, the strong output characteristic is not degraded compared to the prior art.

Thirdly, for the spin-valve element 36, a change in relation between the direction of magnetization of the pin layer 20 and the direction of magnetization of the free layer 22 is taken as a change in resistance. This makes the change in resistance independent from the direction of the sense current, and it is sufficient for the sense current to flow through the spin-valve element 36. There may be a case where the antiferromagnetic layer 35 and the backing layer 37 are made higher that the height h1 of the spin-valve element 36, thus affecting the characteristics of the spin-valve element 36. Even in such a case, although there arises a change in the flow of the sense current within the spin-valve element 36, no noise will be produced in the reproduction signal.

Fourthly, the resistance of the antiferromagnetic layer 35 and the backing layer 37 is generally higher than that of the spin-valve element 36. This makes it possible for most of the sense current to flow within the spin-valve element 36, even if the height of the antiferromagnetic layer 35 and the backing layer 37 is made higher than the height h1 of the spin-valve element 36. Therefore, the strong output characteristic has almost no degradation compared to the prior art.

FIGS. 3A–3C show a detailed structure of the above GMR magnetic head 30. The GMR magnetic head 30 is integrated with the induction-type magnetic head 60 for recording only, so as to form the composite magnetic head 68. The composite magnetic head 68 is provided at the back end surface of the slider 50.

As shown in FIGS. 3A–3C, a substrate protection layer 51, a lower magnetic shield layer 52 and a lower non-magnetic insulating layer 53 are provided, in that order, on the back end surface of the slider 50. On top of those, an upper non-magnetic insulating layer 54 and an upper magnetic shield layer 55 are provided. Substantially, the GMR magnetic head 30 includes the spin-valve head element 31, the electrodes 32,33, the magnetic shield layer 52, the non-magnetic insulating layer 53, the non-magnetic insulating layer 54 and the magnetic layer 55, the element and the electrodes being held between the latter four layers.

The induction-type magnetic head 60 is formed on the magnetic shield 55. The induction-type magnetic head 60 uses the magnetic shield 55 as a lower magnetic pole layer. The induction-type magnetic head 60 includes an insulating layer 61 on the magnetic shield layer 55, a wound-up coil pattern 62 penetrating through the insulating layer 61, an upper magnetic pole layer 63 on the insulating layer 61 and a non-magnetic gap layer 64. The magnetic pole layer 63 is connected to the magnetic shield layer 55 used as a magnetic pole layer at the center of the wound-up coil pattern 62. Also, the non-magnetic gap layer 64 is held between the non-magnetic pole layer 63 and the magnetic shield layer 55.

Figure 4:
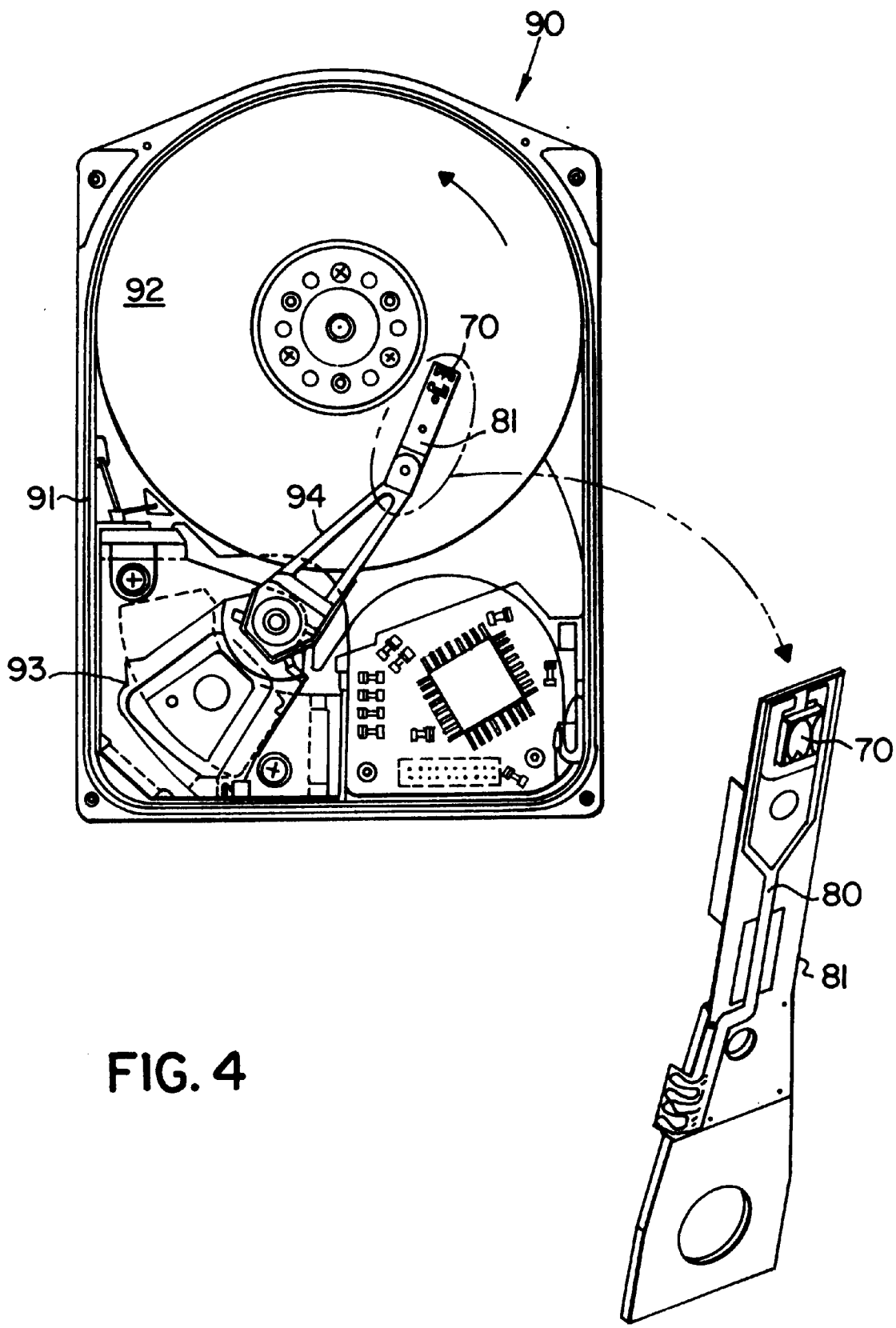
FIG. 4 is a diagram showing a magnetic disk device having a magnetic head slider shown in FIG. 3A.

FIG. 3A shows a magnetic head slider 70 having the GMR magnetic head 30 and the induction-type magnetic head 60 at the back end surface of the slider 50. As shown in FIG. 4, the magnetic head slider 70 is fixed on a load beam 81 on which a signal line pattern 80 is formed, and is assembled in a magnetic disk device 90.

As shown in FIG. 4, the magnetic disk device 90 as a magnetic storage device includes, in a housing 91, a magnetic disk 92 as a rotating magnetic storage medium, an electro-magnetically driven actuator 93 having a coil and a permanent magnet, an arm 94 rotated by the actuator 93, the load beam 81 fixed at the tip of the arm 94 and the magnetic head slider 70 at the tip of the load beam 81. The magnetic disk 92 is rotated and the actuator 93 is driven. Thereby the arm 94 is pivoted and the magnetic head slider 70 is moved so as to access a predetermined track 95 of the magnetic disk 92. The induction-type magnetic head 60 records the information and the GMR magnetic head 30 reproduces the information.

By utilizing the above induction-type magnetic head 60, it is possible for the magnetic disk device 90 to produce signals with reduced noise compared to the prior art.

Also, in FIG. 2, one of the antiferromagnetic layer 35 and the backing layer 37 may have a height of h2 and the other may have a height of h1.

Figure 5:
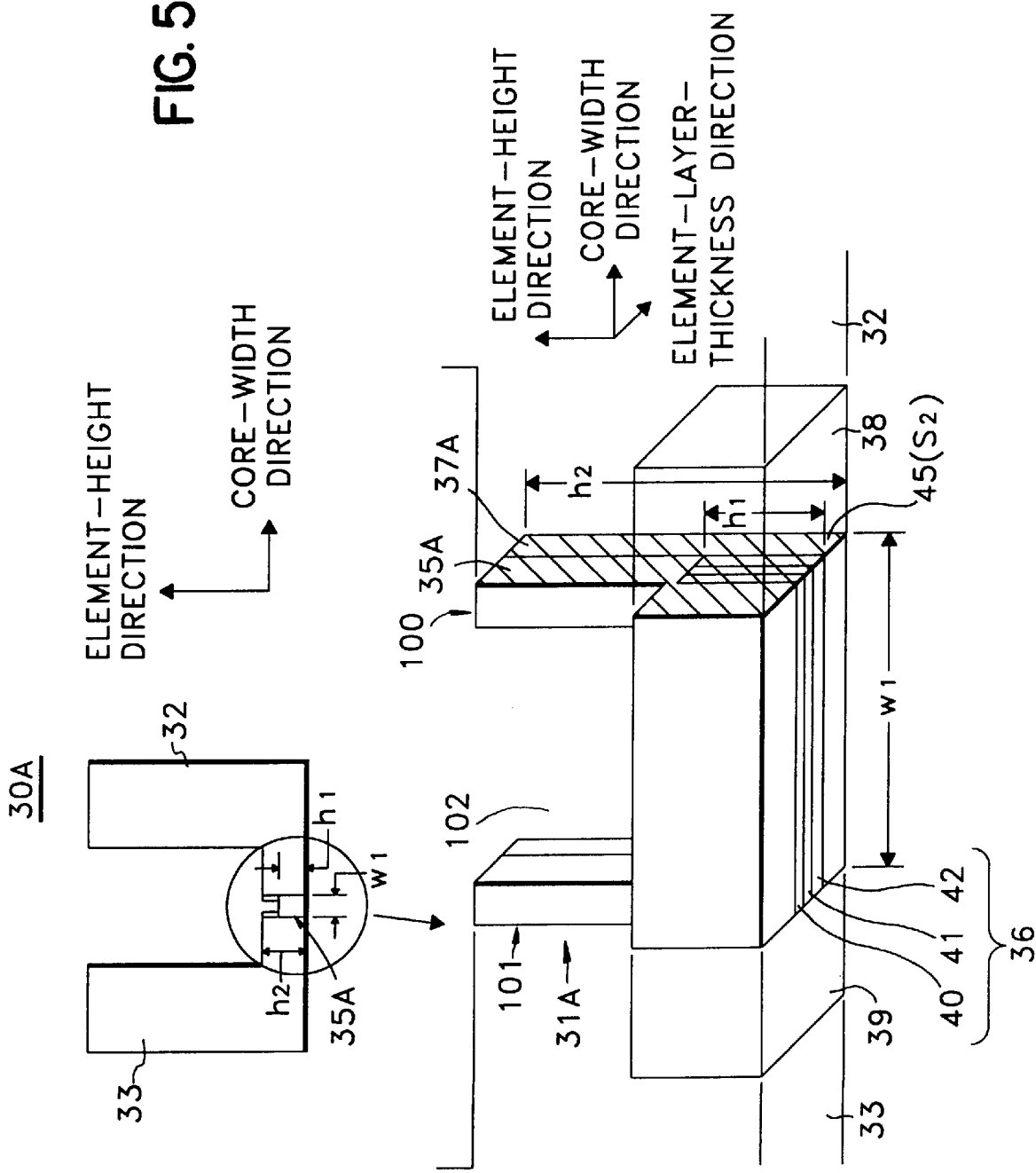
FIG. 5 is a schematic diagram showing a GMR magnetic head of the second embodiment of the present invention.

FIG. 5 shows a GMR magnetic head 30A of the second embodiment of the present invention. In FIG. 5, components which are similar to those shown in FIG. 2 are indicated with similar references.

The GMR magnetic head 30A has a spin-valve head element 31A. The spin-valve head element 31A has an antiferromagnetic layer 35A and a backing layer 37A. The antiferromagnetic layer 35A and the backing layer 37A are formed such that only portions of both ends in the core-width direction have a height h2 which is higher than the height h1 of the spin-valve element 36, and the remaining portions have a height of h1. Portions 100,101 have a greater height and 102 is a through opening. The area of the end surface 45 of the spin-valve head element 31 is S1 and the contact area of the part where the electrodes 32,33 and the spin-valve head element 31 are connected is S2. Therefore, the resistance of the connection part is lower than that of the prior art. This lowers the resistance of the path through which the sense current flows to a level less than that of the prior art, thereby the head-noise is reduced and the S/N ratio is increased when compared to the prior art.

Since part of the antiferromagnetic layer 35A and the backing layer 37A other than the portion of both ends in the core-width direction has a height of h1, the sense current only flows through the spin-valve element 36. Therefore, efficiency in using the sense current is improved compared to the GMT magnetic head 30 in FIG. 2, therefore the GMR magnetic head 30A has a strong output characteristic.

It is also possible to construct a magnetic disk device using the GMR magnetic head 30A.

Further, the present invention is not limited to these embodiments, but variations and modifications may be made without departing from the scope of the present invention.

What is claimed is:

1. A magnetic head comprising:

a spin-valve head element having a spin-valve element, hard magnetic layers at each end of said spin-valve element in a core-width direction, a backing layer laminated on said spin-valve element and an antiferromagnetic layer laminated on said spin-valve element; and electrodes connected to each end of said spin-valve head element, respectively, wherein a height of said backing layer and said antiferromagnetic layer is more than twice a height of said spin-valve element.

2. A magnetic head comprising:

a spin-valve head element having a spin-valve element, hard magnetic layers at each end of said spin-valve element in a core-width direction, a backing layer laminated on said spin-valve element and an antiferromagnetic layer laminated on said spin-valve element; and electrodes connected to each end of said spin-valve head element, respectively, wherein heights of both end portions of at least one of said layers laminated on said spin-valve element are more than twice a height of said spin-valve element.

3. The magnetic head defined in claim 2 wherein a height of a middle portion of said at least one of said plurality of layers is less than a height of said end portions thereof such that a through opening is defined between said end portions.

4. A magnetic head slider comprising a magnetic head at an end surface thereof, the magnetic head including:

a spin-valve head element having a spin-valve element, hard magnetic layers at each end of said spin-valve element in a core-width direction, a backing layer laminated on said spin-valve element and an antiferromagnetic layer laminated on said spin-valve element; and electrodes connected to each end of said spin-valve head element, respectively, wherein a height of said backing layer and said antiferromagnetic layer is more than twice a height of said spin-valve element.

5. A magnetic head slider comprising a magnetic head at an end surface thereof, the magnetic head including:

a spin-valve head element having a spin-valve element, hard magnetic layers at each end of said spin-valve element in a core-width direction, a backing layer laminated on said spin-valve element and an antiferromagnetic layer laminated on said spin-valve element; and electrodes connected to each end of said spin-valve head element, respectively, wherein heights of both end portions of at least one of said layers laminated on said spin-valve element are more than twice a height of said spin-valve element.

6. The magnetic head slider defined in claim 5 wherein a height of a middle portion of said at least one of said plurality of layers is less than a height of said end portions thereof such that a through opening is defined between said end portions.

7. A magnetic storage device comprising:

a magnetic storage medium; and a magnetic head slider including a magnetic head at an end surface thereof, the magnetic head including:

a spin-valve head element having a spin-valve element, hard magnetic layers at each end of said spin-valve element in a core-width direction, a backing layer laminated on said spin-valve element and an antiferromagnetic layer laminated on said spin-valve element; and electrodes connected to each end of said spin-valve head element, respectively, wherein a height of said backing layer and said antiferromagnetic layer is more than twice a height of said spin-valve element.

8. A magnetic storage device comprising:

a magnetic storage medium; and a magnetic head slider including a magnetic head at an end surface thereof, the magnetic head including:

a spin-valve head element having a spin-valve element, hard magnetic layers at each end of said spin-valve element in a core-width direction, a backing layer laminated on said spin-valve element and an antiferromagnetic layer laminated on said spin-valve element; and electrodes connected to each end of said spin-valve head element, respectively, wherein heights of both end portions of at least one of said layers laminated on said spin-valve element are more than twice a height of said spin-valve element.

9. The magnetic storage device defined in claim 8 wherein a height of a middle portion of said at least one of said plurality of layers is less than a height of said end portions thereof such that a through opening is defined between said end portions.

* * * * *